United States Patent
Still et al.

(10) Patent No.: US 9,975,407 B2
(45) Date of Patent: May 22, 2018

(54) VEHICLE SUN VISOR ASSEMBLY HAVING AN ELECTRICAL SYSTEM

(71) Applicant: MOTUS INTEGRATED TECHNOLOGIES, Holland, MI (US)

(72) Inventors: Kevin Andrew Still, Wyoming, MI (US); Philip Allen Lehman, West Olive, MI (US)

(73) Assignee: Motus Integrated Technologies, Holland, MI (US)

( * ) Notice: Subject to any disclaimer, the term of this patent is extended or adjusted under 35 U.S.C. 154(b) by 0 days. days.

(21) Appl. No.: 15/440,769

(22) Filed: Feb. 23, 2017

(65) Prior Publication Data

US 2017/0240028 A1 Aug. 24, 2017

Related U.S. Application Data

(60) Provisional application No. 62/298,756, filed on Feb. 23, 2016.

(51) Int. Cl.
*B60J 3/02* (2006.01)
*B60R 16/04* (2006.01)

(52) U.S. Cl.
CPC ............. *B60J 3/0278* (2013.01); *B60R 16/04* (2013.01)

(58) Field of Classification Search
CPC ........ B60J 3/0282; B60J 3/0278; B60R 16/04
See application file for complete search history.

(56) References Cited

U.S. PATENT DOCUMENTS

| | | | |
|---|---|---|---|
| 5,076,634 A * | 12/1991 | Muller | B60J 3/0278 136/245 |
| 5,274,532 A | 12/1993 | Gabas | |
| 5,475,573 A | 12/1995 | White | |
| 5,553,907 A | 9/1996 | Finn et al. | |
| 5,564,771 A | 10/1996 | Chesters | |
| 5,603,547 A | 2/1997 | Finn et al. | |
| 5,651,605 A | 7/1997 | Corn | |
| 5,727,837 A | 3/1998 | Viertel | |
| 5,871,251 A | 2/1999 | Welling et al. | |
| 5,890,792 A | 4/1999 | Finn et al. | |
| 6,059,347 A | 5/2000 | Davalos | |
| 6,132,072 A | 10/2000 | Turnbull et al. | |
| 6,264,339 B1 | 7/2001 | von Glasow | |
| 6,264,352 B1 | 7/2001 | Zapinski | |
| 6,270,240 B1 | 8/2001 | Inoue | |
| 6,283,622 B1 | 9/2001 | Chupp et al. | |
| 6,325,527 B1 | 12/2001 | Lee | |
| 6,368,114 B1 | 4/2002 | Inoue | |
| 6,435,593 B2 | 8/2002 | Welter | |
| 6,464,381 B2 | 10/2002 | Anderson, Jr. et al. | |

(Continued)

*Primary Examiner* — Pinel E Romain
(74) *Attorney, Agent, or Firm* — Fletcher Yoder, P.C.

(57) ABSTRACT

A vehicle sun visor assembly includes a sun visor body and an electrical system. The electrical system includes a power source tray configured to receive a power source. The sun visor body includes a mounting feature configured to couple the power source tray to the sun visor body and to facilitate removal of the power source tray from the sun visor body. In addition, the electrical system includes at least one electrical contact coupled to the sun visor body and configured to establish an electrical connection with the power source while the power source tray is engaged with the mounting feature.

20 Claims, 7 Drawing Sheets

(56) References Cited

U.S. PATENT DOCUMENTS

| | | |
|---|---|---|
| 6,499,868 B1 * | 12/2002 | Kerul, Jr. .............. B60J 3/0282 362/492 |
| 6,554,437 B2 | 4/2003 | von Glasow |
| 6,595,670 B2 | 7/2003 | Sakamoto et al. |
| 6,692,060 B1 | 2/2004 | Wilson |
| 7,044,531 B2 | 5/2006 | Schaad |
| 7,128,451 B2 | 10/2006 | Kaphengst et al. |
| 7,217,017 B2 | 5/2007 | Smith |
| 7,234,751 B2 | 6/2007 | Umemura |
| 7,258,470 B2 | 8/2007 | Ogawa |
| 7,311,427 B2 | 12/2007 | Barker et al. |
| 7,384,088 B2 | 6/2008 | Remy |
| 7,416,319 B2 | 8/2008 | Richard et al. |
| 7,461,886 B1 | 12/2008 | Wang et al. |
| 7,534,018 B2 * | 5/2009 | Nicola .................. B60J 3/0282 362/137 |
| 8,038,331 B2 | 10/2011 | Kino et al. |
| 8,047,599 B2 | 11/2011 | Dai |
| 8,096,688 B2 | 1/2012 | Kino et al. |
| 8,425,094 B2 | 4/2013 | Stakoe et al. |
| 8,651,715 B2 | 2/2014 | Stakoe et al. |
| 9,238,433 B2 * | 1/2016 | Stakoe ................. B60J 3/0282 |
| 2001/0024370 A1 * | 9/2001 | Macher ................ B60Q 1/2665 362/492 |
| 2003/0030063 A1 | 2/2003 | Sosniak et al. |
| 2006/0181893 A1 | 8/2006 | Fernandez et al. |
| 2007/0063528 A1 | 3/2007 | Ogawa |
| 2008/0074866 A1 | 3/2008 | Barker et al. |
| 2008/0130305 A1 | 6/2008 | Wang et al. |
| 2010/0225248 A1 | 9/2010 | Cruickshank et al. |
| 2011/0019391 A1 | 1/2011 | Welter |
| 2012/0327674 A1 | 12/2012 | Stakoe et al. |
| 2013/0033060 A1 | 2/2013 | Marcus et al. |
| 2013/0292959 A1 | 11/2013 | West |
| 2014/0119037 A1 | 5/2014 | Stakoe et al. |
| 2014/0265841 A1 | 9/2014 | Baek |
| 2014/0286028 A1 | 9/2014 | Haraguchi |
| 2014/0362595 A1 | 12/2014 | Marcos Primo et al. |
| 2015/0097483 A1 | 4/2015 | Huelke et al. |

* cited by examiner

VEHICLE SUN VISOR ASSEMBLY HAVING AN ELECTRICAL SYSTEM

CROSS REFERENCE TO RELATED APPLICATION

This application claims priority from and the benefit of U.S. Provisional Application Ser. No. 62/298,756, entitled "VEHICLE SUN VISOR ASSEMBLY HAVING AN ELECTRICAL SYSTEM", filed Feb. 23, 2016, which is hereby incorporated by reference in its entirety.

BACKGROUND

The disclosure relates generally to a vehicle sun visor having an electrical system.

Many vehicles employ sun visors to shield occupants from sunlight, thereby enabling the occupants to focus on the surrounding environment. For example, certain vehicles include sun visors positioned adjacent to a top portion of the windshield to facilitate access by a driver and/or front passenger. Under certain lighting conditions, a driver may deploy the sun visor (e.g., by rotating the sun visor about a rotational axis from a storage position to a deployed position) to reduce light transmission into the vehicle interior, thereby enabling the driver to focus on vehicle operations.

Certain sun visors include a vanity mirror and a lighting system configured to illuminate a vehicle occupant, thereby enabling the vehicle occupant to view a reflection in the vanity mirror during low light conditions. The lighting system may be part of a visor electrical system, which may include a power source (e.g., battery) configured to provide electrical power to a light source (e.g., light emitting diode (LED)) of the lighting system. In certain electrical systems, the power source may be positioned proximate to the lighting system and the vanity mirror. Unfortunately, positioning the power source proximate to the vanity mirror may increase the mass moment of inertia of the sun visor about the rotational axis. Accordingly, the torque sufficient to rotate the sun visor about the rotational axis from the deployed position to the storage position may be significantly greater than the torque sufficient to rotate a sun visor that does not include an internal power source (e.g., a sun visor having a lighting system powered by a vehicle power source, such as the vehicle battery).

BRIEF DESCRIPTION

The present disclosure relates to a vehicle sun visor assembly including a sun visor body and an electrical system. The electrical system includes a power source tray configured to receive a power source. The sun visor body includes a mounting feature configured to couple the power source tray to the sun visor body and to facilitate removal of the power source tray from the sun visor body. In addition, the electrical system includes at least one electrical contact coupled to the sun visor body and configured to establish an electrical connection with the power source while the power source tray is engaged with the mounting feature.

The present disclosure also relates to a vehicle sun visor assembly including a sun visor body and an electrical system. The electrical system includes a power source mounting assembly configured to receive a power source. The sun visor body is configured to rotate about a rotational axis between a deployed position and a storage position, and a lateral centerline of the power source mounting assembly is positioned closer to the rotational axis than to a lateral centerline of the sun visor body.

The present disclosure further relates to a vehicle sun visor assembly including a circuit board extending along a longitudinal axis of the vehicle sun visor assembly. The vehicle sun visor assembly also includes a first light source mounted to a mounting surface of the circuit board. The mounting surface extends substantially perpendicularly to a vertical axis of the vehicle sun visor assembly. In addition, the vehicle sun visor assembly includes a first light guide having a light receiving surface. The mounting surface faces toward the light receiving surface of the first light guide, the first light source is configured to emit light toward the light receiving surface of the first light guide, and the first light guide is configured to receive the light from the first light source through the light receiving surface and to emit the light from the first light source toward a vehicle interior.

DETAILED DESCRIPTION

Figure 1:
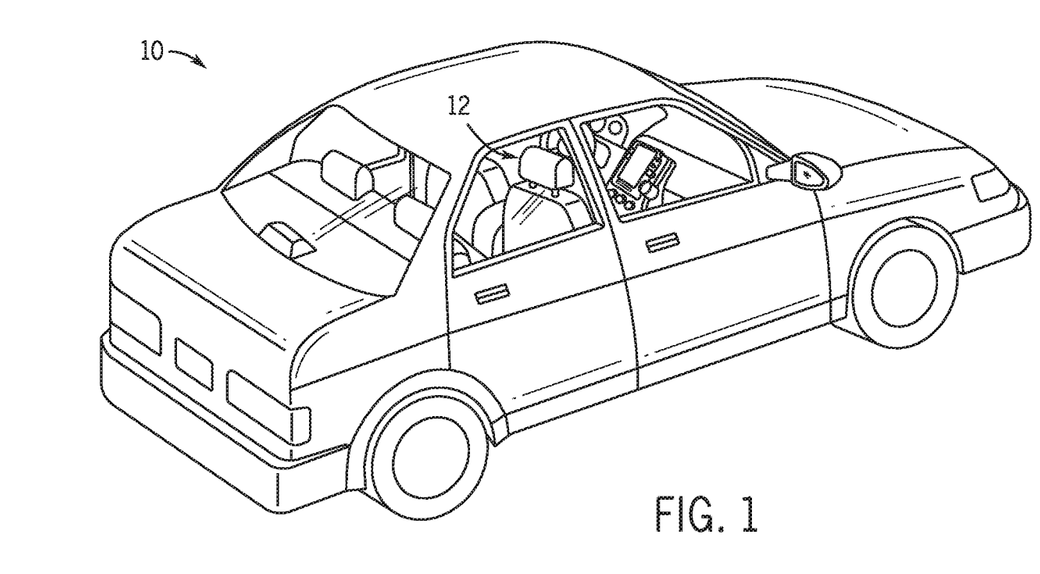
FIG. 1 is a perspective view of an embodiment of a vehicle that may include at least one sun visor assembly having an electrical system.

FIG. 1 is a perspective view of an embodiment of a vehicle 10 that may include at least one sun visor assembly having an electrical system. In certain embodiments, the vehicle 10 may include sun visors within an interior 12 of the vehicle 10. In such embodiments, the sun visors are configured to shield vehicle occupants from sunlight. Each sun visor may include a vanity mirror and a lighting system configure to illuminate a vehicle occupant, thereby enabling the vehicle occupant to view a reflection in the vanity mirror during low light conditions. The lighting system may be part of a visor electrical system, which may include a power source (e.g., battery) configured to provide electrical power to a light source (e.g., light emitting diode (LED)) of the lighting system. In certain embodiments, a vehicle sun visor assembly includes a sun visor body and an electrical system. The electrical system includes a power source tray configured to receive a power source (e.g., battery), and the sun visor body includes a mounting feature configured to couple the power source tray to the sun visor body and to facilitate removal of the power source tray from the sun visor body. In addition, the sun visor assembly includes an electrical contact coupled to the sun visor body and configured to establish an electrical connection with the power source while the power source tray is engaged with the mounting feature. The removable power source tray provides easy access to the power source, thereby facilitating the process of removal and replacement of the power source. In addition, because the mounting feature of the sun visor body may be positioned in a variety of locations, the design opportunities of the sun visor assembly may be enhanced.

In certain embodiments, the vehicle sun visor includes a sun visor body and an electrical system having a power source mounting assembly. The power source mounting assembly is configured to receive a power source. In addition, the sun visor body is configured to rotate about a rotational axis between a deployed position and a storage position. A lateral centerline of the power source mounting assembly is positioned closer to the rotational axis than to a lateral centerline of the sun visor body. Accordingly, the mass moment of inertia of the sun visor assembly about the rotational axis may be reduced, as compared to sun visor assemblies in which the power source is positioned proximate to a vanity mirror assembly. As a result, the torque sufficient to rotate the sun visor assembly about the rotational axis from the deployed position to the storage position may be significantly reduced.

In certain embodiments, the vehicle sun visor assembly includes a circuit board extending along a longitudinal axis of the vehicle sun visor assembly. The sun visor assembly also includes a light source mounted to a mounting surface of the circuit board that extends substantially perpendicularly to a vertical axis of the vehicle sun visor assembly. In addition, the sun visor assembly includes a light guide having a light receiving surface. The mounting surface faces toward the light receiving surface of the light guide, the light source is configured to emit light toward the light receiving surface of the light guide, and the light guide is configured to receive the light from the light source through the light receiving surface and to emit the light from the light source toward a vehicle interior. Because the mounting surface of the circuit board faces the light receiving surface of the light guide, a top-emitting light emitting diode (LED) may be utilized. As a result, the efficiency of the visor electrical system may be enhanced, as compared to an electrical system that employs a side-emitting LED.

Figure 2:
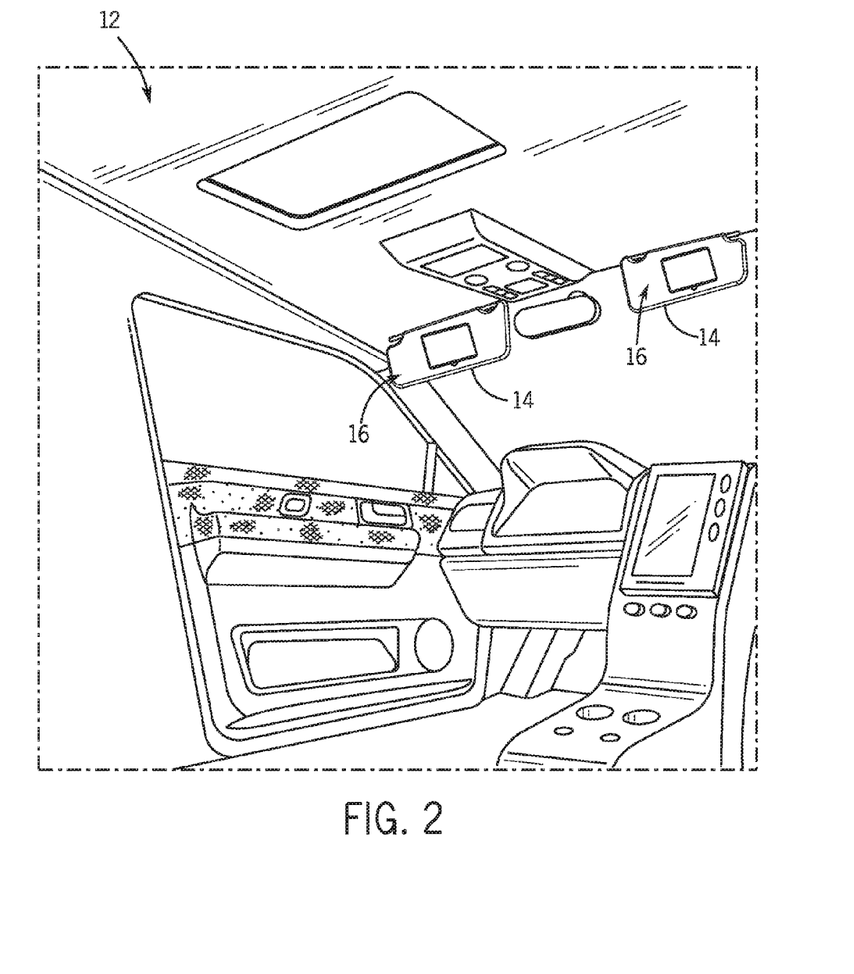
FIG. 2 is a perspective view of a part of the interior of the vehicle of FIG. 1.

FIG. 2 is a perspective view of a part of the interior 12 of the vehicle 10 of FIG. 1. As illustrated, the vehicle interior 12 includes a sun visor assembly 14 having an electrical system 16. As previously discussed, the electrical system may provide easy access to the power source by providing the power source in a removable power source tray. In addition, by mounting the power source closer to the rotational axis of the sun visor assembly than to a lateral centerline of the sun visor body, the torque sufficient to rotate the sun visor assembly from the deployed position to the storage position may be significantly reduced. Furthermore, the electrical system may reduce the power utilized by the lighting system by employing a top-emitting LED on a circuit board mounting surface that faces a light receiving surface of a light guide.

Figure 3:
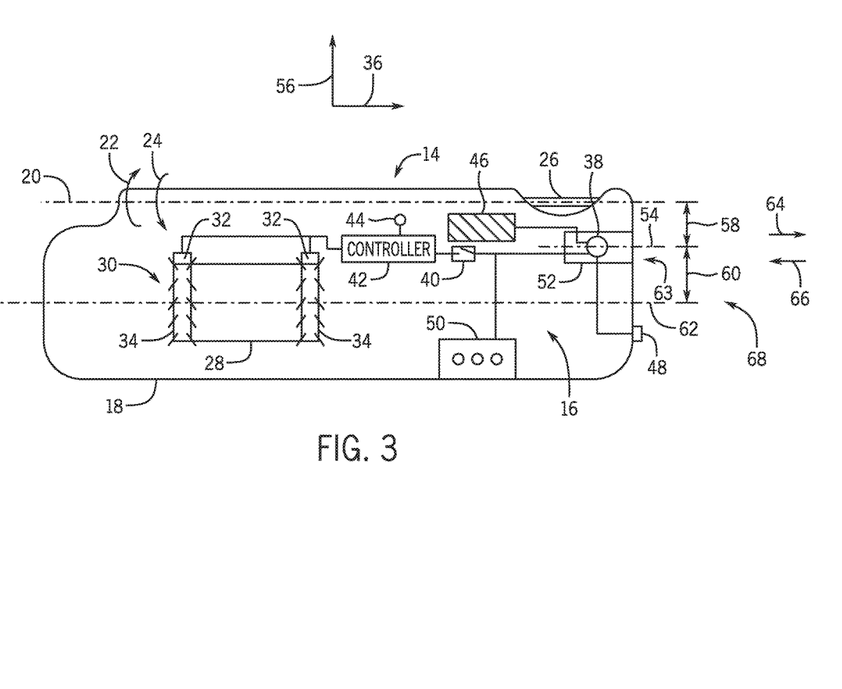
FIG. 3 is a schematic view of an embodiment of a sun visor assembly having an electrical system.

FIG. 3 is a schematic view of an embodiment of a sun visor assembly 14 having an electrical system 16. In the illustrated embodiment, the sun visor assembly 14 includes a sun visor body 18 configured to rotate about a rotational axis 20 between a storage position (e.g., parallel to a headliner of the vehicle interior and/or in contact with the headliner) and a deployed position (e.g., positioned to reduce light transmission into the vehicle interior). For example, to transition the sun visor body 18 from the illustrated deployed position to the storage position, a vehicle occupant may rotate the sun visor body 18 in a first rotational direction 22 about the rotational axis 20. Conversely, to transition the sun visor body 18 from the storage position to the illustrated deployed position, the vehicle occupant may rotate the sun visor body 18 in a second rotational direction 24, opposite the first rotational direction 22, about the rotational axis 20. In the illustrated embodiment, the sun visor assembly 14 includes a pivot rod 26 coupled to the sun visor body 18. The pivot rod 26 is configured to engage a corresponding clip within the vehicle interior to secure the sun visor assembly 14 in a forward position (e.g., proximate to the windshield) and to facilitate rotation of the sun visor body 18 about the rotational axis 20.

In the illustrated embodiment, the sun visor assembly 14 includes a vanity mirror 28 and a lighting system 30 configured to illuminate a vehicle occupant, thereby enabling the vehicle occupant to view a reflection in the vanity mirror 28 during low light conditions. The lighting system 30 includes two light sources 32 and two light guides 34. Each light source 32 is configured to emit light toward a respective light guide 34, and each light guide 34 is configured to emit light toward the vehicle interior. While the illustrated embodiment includes two light sources 32 and two light guides 34, it should be appreciated that in alternative embodiments, the lighting system may include more or fewer light sources (e.g., 1, 2, 3, 4, or more) and/or more or fewer light guides (e.g., 1, 2, 3, 4, or more). In addition, while the light guides 34 are arranged on opposite lateral sides of the vanity mirror 28 (e.g., opposite sides of the vanity mirror 28 along a lateral axis 36) in the illustrated embodiment, it should be appreciated that the light guide(s) may be positioned in other suitable locations in alternative embodiments.

In the illustrated embodiment, the lighting system 30 is part of the visor electrical system 16, and the visor electrical system 16 includes a power source 38 (e.g., batteries, etc.) configured to provide electrical power to the light sources 32 of the lighting system 30. The power source 38 is electrically coupled to a switch 40 configured to activate the light sources 32 by completing an electrical connection between the power source 38 and the light sources 32, and to deactivate the light sources 32 by interrupting the electrical connection between the power source 38 and the light sources 32. In certain embodiments, the switch 40 may be positioned such that opening a vanity mirror cover engages the switch 40 and closing the vanity mirror cover disengages the switch 40. Accordingly, the light sources 32 may be activated while the vanity mirror cover is open and deactivated while the vanity mirror cover is closed.

In the illustrated embodiment, the electrical system 16 includes a controller 42 configured to control operation of the light sources 32. For example, the controller 42 may be configured to gradually increase the brightness of the light sources 32 upon engagement of the switch 40 until an operational brightness is achieved. In addition, the controller 42 may be configured to gradually decrease the brightness of the light sources 32 upon disengagement of the switch 40 until the light sources 32 are deactivated. The controller 42 may also be configured to deactivate the light sources 32 after a threshold duration, even while the switch is engaged. In the illustrated embodiment, the controller 42 is communicatively coupled to a light sensor 44. The light sensor 44 may be configured to output a signal indicative of brightness of the ambient light within the vehicle interior, and the controller 42 may be configured to control the light sources 32 based on the signal. For example, the controller 42 may be configured to deactivate the light sources 32, even while the switch 40 is engaged, during bright ambient light conditions (e.g., when viewing the vanity mirror during the daytime). As a result, the operational duration of the power source 38 (e.g., the length of time the power source 38 may provide sufficient electrical power to the light sources 32 to induce the light sources 32 to illuminate) may be extended. While the illustrated embodiment includes a controller 42 and a light sensor 44, it should be appreciated that in alternative embodiments, the controller and/or the light sensor may be omitted.

In certain embodiments, the power source 38 may be configured to receive electrical power, thereby increasing the operational duration of the power source 38. For example, the power source 38 may include rechargeable batteries configured to recharge in response to receiving electrical power. In the illustrated embodiment, the electrical system 16 includes an energy harvester, such as the illustrated solar cell 46. The solar cell 46 may be configured to provide electrical power to the power source at least during bright ambient lighting conditions, thereby increasing the operational duration of the power source 38. While the illustrated embodiment include a solar cell 46, it should be appreciated that other energy harvesters (e.g., vibrational energy harvesters, thermal gradient energy harvesters, etc.) may be electrically coupled to the power source, either individually or in combination (e.g., in combination with one another, in combination with the solar cell, etc.), in alternative embodiments. Furthermore, in the illustrated embodiment, the electrical system 16 includes an electrical port 48 (e.g., universal serial bus (USB) port, etc.) configured to receive electrical power. As illustrated, the electrical port 48 is electrically coupled to the power source 38, thereby enabling the power source 38 to receive electrical power from the electrical port 48. An electrical cable may be selectively coupled to the electrical port 48 to provide electrical power to the power source 38, thereby increasing the operational duration of the power source 38. While the illustrated embodiment includes an energy harvester and an electrical port, it should be appreciated that in alternative embodiments, the energy harvester and/or the electrical port may be omitted.

In the illustrated embodiment, the electrical system 16 includes a transceiver 50 configured to control remote electronic devices (e.g., garage door openers, access gates, etc.). As illustrated, the transceiver 50 is electrically coupled to the power source 38, and the power source 38 is configured to provide sufficient electrical power for the lighting system 30 and the transceiver 50. For example, the power source 38 may include one or more AA and/or AAA batteries, or a rechargeable battery having sufficient electrical capacity to power the lighting system 30 and the transceiver 50. In certain embodiments, the lighting system or the transceiver may be omitted. In such embodiments, a power source having less electrical capacity may be utilized, e.g., one or more coin cell batteries or a smaller rechargeable battery. In further embodiments, the electrical system may include additional electrical device, such as a display and/or an audio system. In such embodiments, a power source having greater electrical capacity may be utilized, e.g., a larger rechargeable battery.

In the illustrated embodiment, the power source 38 is coupled to the sun visor body 18 by a power source mounting assembly, such as the illustrated power source tray 52. Because the power source 38 is not mounted to a circuit board of the lighting system 30 (e.g., a circuit board supporting the light sources 32), a circuit board of the transceiver 50, or a circuit board of another device, the sun visor assembly is reconfigurable (e.g., by omitting the lighting system 30, by omitting the transceiver 50, by adding additional electronic devices, etc.) without modifying the electrical connections to the power source and/or without modifying the portion of the sun visor body that supports the power source tray. However, the power source tray may be selected to accommodate a power source that provides sufficient electrical power for the electrical devices of the sun visor assembly. For example, a power source tray may be configured to support two coin cell batteries for sun visor assemblies that include the lighting system. Another power source tray may be configured to support four coin cell batteries for sun visor assemblies that include the lighting system and the transceiver. And, a further power source tray may be configured to support six coin cell batteries for sun visor assemblies that include the lighting system, the transceiver, and another electrical device (e.g., audio system, video system, etc.). In addition, the power source tray may be configured to support different battery types (e.g., coin cells, button cells, cylindrical batteries, etc.) to provide a power source that provides sufficient electrical power for the electrical devices of the sun visor assembly.

As illustrated, a lateral centerline 54 of the power source tray 52 (e.g., a centerline extending along the lateral axis 36 at the midpoint of the extent of the power source tray 52 along a vertical axis 56) is positioned a first distance 58 from the rotational axis 20 along the vertical axis 56. In the illustrated embodiment, the first distance 58 is less than a second distance 60 between the lateral centerline 54 of the power source tray 52 and a lateral centerline 62 of the sun visor body 18 (e.g., a centerline extending along the lateral axis 36 at the midpoint of the extent of the sun visor body 18 along the vertical axis 56) along the vertical axis 56. Accordingly, the lateral centerline 54 of the power source tray 52 is positioned closer to the rotational axis 20 than to the lateral centerline 62 of the sun visor body 18. Therefore, the mass moment of inertia of the sun visor assembly 14 about the rotational axis 20 may be reduced, as compared to sun visor assemblies in which the power source is positioned proximate to a vanity mirror assembly. As a result, the torque sufficient to rotate the sun visor assembly 14 about the rotational axis 20 from the deployed position to the storage position may be significantly reduced.

As discussed in detail below, the sun visor body 18 includes a mounting feature, such as the illustrated opening 63, configured to couple the power source tray 52 to the sun visor body 18 (e.g., by receiving the power source tray through the opening) and to facilitate removal of the power source tray 52 from the sun visor body 18. For example, in the illustrated embodiment, the power source tray 52 may be removed from the sun visor body 18 via translation in a direction 64 along the lateral axis 36. With the power source tray 52 removed, the power source 38 may be removed and replaced (e.g., at the end of the useful life of the power source). The power source tray 52 may then be disposed within the sun visor body 18 through the opening 63 via translation in a direction 66 along the lateral axis 36. The power source tray 52 may be retained within the sun visor body 18 by a clip, a magnet, or any other suitable retaining device/system (e.g., which may be part of the mounting feature). As discussed in detail below, the electrical system 16 includes an electrical contact coupled to the sun visor body 18 and configured to establish an electrical connection with the power source 38 while the power source tray 52 is disposed within the sun visor body 18. The removable power source tray provides easy access to the power source, thereby facilitating the process of removal and replacement of the power source.

In the illustrated embodiment, the opening 63 is positioned on a lateral side 68 of the sun visor body 18. However, it should be appreciated that in alternative embodiments, the opening may be positioned at any other suitable location on the sun visor body. For example, the opening may be positioned on a top vertical side of the sun visor body, on a bottom vertical side of the sun visor body, or on the other lateral side of the sun visor body. Because the opening in the sun visor body may be positioned in a variety of locations, the design opportunities of the sun visor assembly may be enhanced. In addition, it should be appreciated that a size of the power source tray 52 and a size of the opening 63 may be particularly configured to accommodate the size and number of power sources. Furthermore, while the illustrated embodiment includes a single power source tray and a single opening, it should be appreciated that in alternative embodiments, the sun visor assembly may include multiple openings and a corresponding number of power source trays (e.g., 1, 2, 3, 4, or more).

While the illustrated embodiment includes a power source tray 52 configured to be substantially (e.g., completely) disposed within the sun visor body, it should be appreciated that other power source tray/sun visor body configurations may be employed in alternative embodiments (e.g., the power source tray may be configured to be partially disposed within the sun visor body). In certain embodiments, the power source tray may form a portion of the outer surface (e.g., show surface) of the sun visor assembly. For example, the power source tray may include the pivot rod and a portion of the sun visor assembly surrounding the pivot rod. In such embodiments, a portion of the power source tray may be disposed within an opening in the sun visor body, or the power source tray may be coupled to a mounting feature of the sun visor body, to secure the power source tray to the sun visor body, thereby forming the sun visor assembly. In further embodiments, the power source may be coupled to the sun visor body by a non-removable power source mounting assembly.

Figure 4:
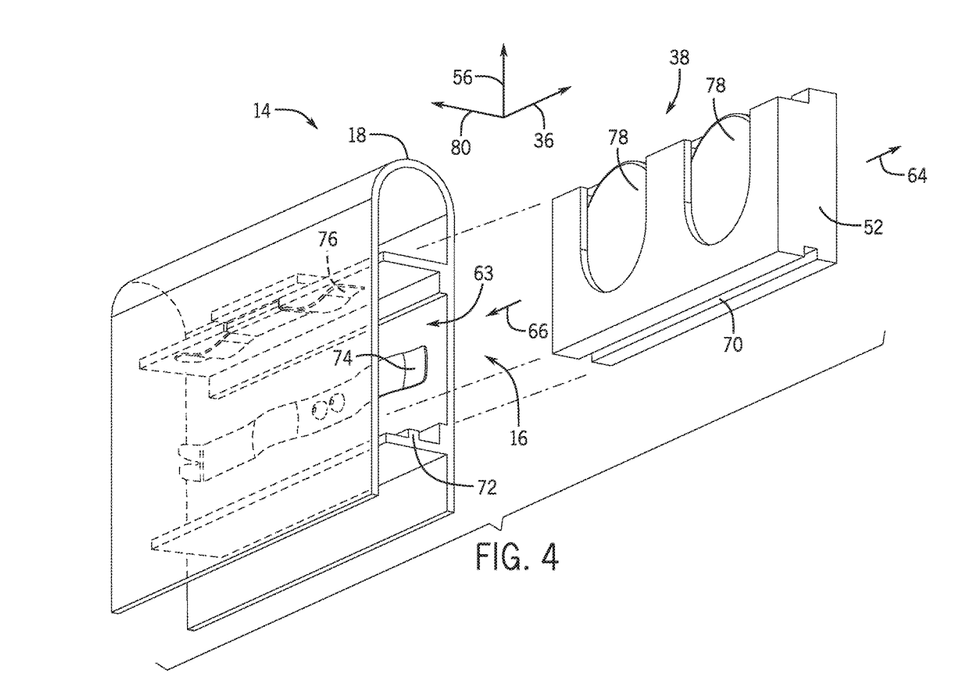
FIG. 4 is a perspective view of a portion of an embodiment of an electrical system that may be employed within the sun visor assembly of FIG. 3, in which a power source tray is removed from a sun visor body.

FIG. 4 is an perspective view of a portion of an embodiment of an electrical system 16 that may be employed within the sun visor assembly 14 of FIG. 3, in which the power source tray 52 is removed from the sun visor body 18. As previously discussed, the power source tray 52 may be disposed within the sun visor body 18 via translation in the direction 66 through the opening 63. In addition, the power source tray 52 may be removed from the sun visor body 18 via translation in the direction 64 through the opening 63. In the illustrated embodiment, the power source tray 52 includes a first guide feature, such as the illustrated groove 70, and the sun visor body 18 includes a second guide feature, such as the illustrated rail 72. The groove 70 is configured to engage the rail 72 to guide the power source tray 52 through the opening 63. While the power source tray includes a groove and the sun visor body includes a rail in the illustrated embodiment, it should be appreciated that in alternative embodiments, the sun visor body may include a groove and the power source tray may include a rail. In further embodiments, the power source tray and/or the sun visor body may include other guide features and/or mounting features, such as tracks, magnets, or clips, among other guide/mounting features.

In the illustrated embodiment, the electrical system 16 includes a first electrical contact 74 coupled to the sun visor body 18 and a second electrical contact 76 coupled to the sun visor body 18. The electrical contacts 74 and 76 are configured to establish an electrical connection with the power source 38 while the power source tray 52 is disposed within the sun visor body 18. In the illustrated embodiment, the power source 38 includes coin cell batteries 78 (e.g., two sets of coin cell batteries, each set including two coin cell batteries stacked on top of one another along a longitudinal axis 80), and the electrical contacts 74 and 76 are configured to contact respective terminals of the coin cell batteries 78. In the illustrated embodiment, each electrical contact is formed from a metal stamping. However, it should be appreciated that in alternative embodiments, the electrical contacts from be formed from other elements (e.g., a coil spring, a pin, a plate, etc.).

Figure 5:
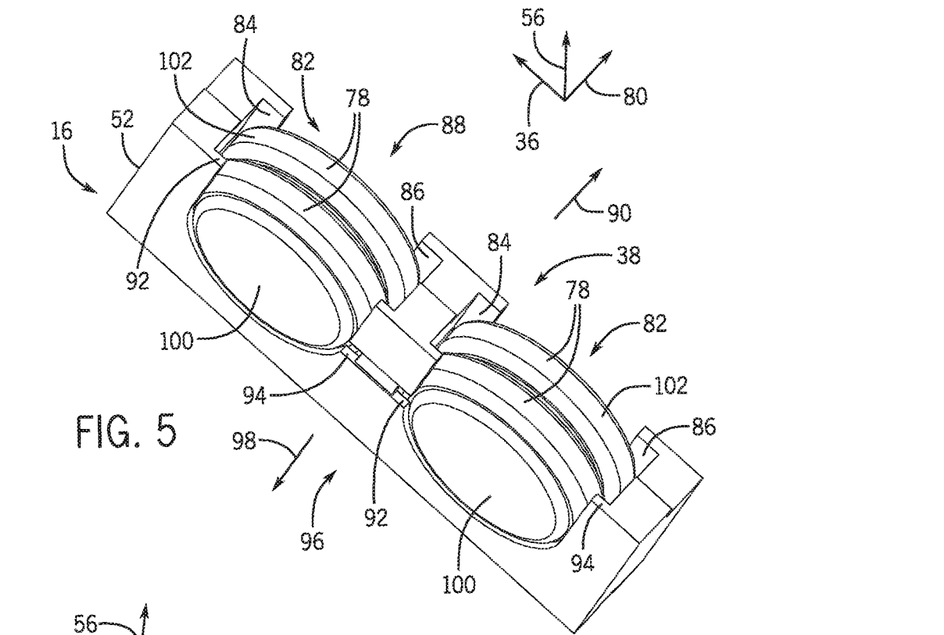
FIG. 5 is a perspective view of the power source tray of FIG. 4.

FIG. 5 is a perspective view of the power source tray 52 of FIG. 4. In the illustrated embodiment, the power source tray 52 includes two slots 82, each configured to receive two coin cell batteries 78. As illustrated, a first lip 84 and a second lip 86 on a first longitudinal side 88 of each slot blocks movement of the coin cell batteries in a first longitudinal direction 90 along the longitudinal axis 80. In addition, a third lip 92 and a fourth lip 94 on a second longitudinal side 96 of each slot blocks movement of the coin cell batteries in a second longitudinal direction 98 along the longitudinal axis 80. While the power source tray 52 is disposed within the sun visor body, the first electrical contact engages first terminals (e.g., negative terminals) 100 of the coin cell batteries 78 on the second longitudinal side 96 of the slots 82, and the second electrical contact engages second terminals (e.g., positive terminals) 102 of the coin cell batteries 78 on the first longitudinal side 88 of the slots 82.

While each slot 82 is configured to receive two coin cell batteries 78 in the illustrated embodiment, it should be appreciated that in alternative embodiments, each slot may be configured to receive more or fewer coin cell batteries (e.g., 1, 2, 3, 4, or more). In addition, while the power source tray 52 includes two slots 82 in the illustrated embodiment, it should be appreciated that in alternative embodiments, the power source tray may include more or fewer slots (e.g., 1, 2, 3, 4, or more). Furthermore, while the illustrated power source tray 52 is configured to receive coin cell batteries, it should be appreciated that in alternative embodiments, the power source tray may be configured to receive button cell batteries, cylindrical batteries (e.g., AA, AAA, etc.), or batteries having other shapes (e.g., rectangular prism, etc.).

Figure 6:
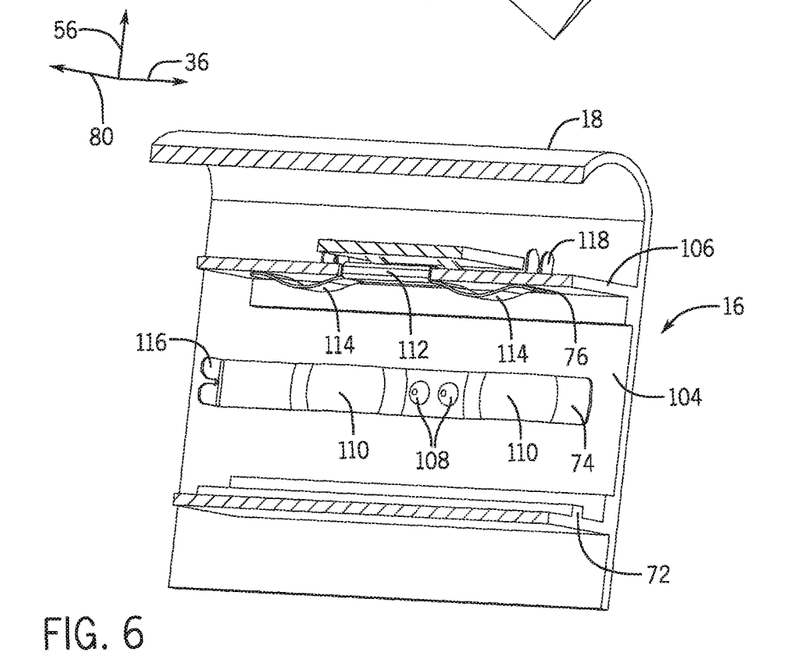
FIG. 6 is a cross-sectional view of the sun visor body of FIG. 4.

FIG. 6 is a cross-sectional view of the sun visor body 18 of FIG. 4. In the illustrated embodiment, the first electrical contact 74 is coupled to a vertical wall 104 of the sun visor body 18, and the second electrical contact 76 is coupled to a lateral wall 106 of the sun visor body 18. The first electrical contact 74 is coupled to the vertical wall 104 by stakes 108, and the first electrical contact 74 includes two protrusions 110 configured to contact the first terminals (e.g., negative terminals) of the respective batteries. The second electrical contact 76 is clipped to the lateral wall 106 via a bend 112, and the second electrical contact 76 includes two protrusions 114 configured to contact the second terminals (e.g., positive terminals) of the respective batteries. The number of protrusions 110 and 114 may be selected to correspond to the number of slots of the power source tray. In the illustrated embodiment, the first electrical contact 74 includes a connector 116 configured to electrical couple the first electrical contact 74 to other components of the electrical system 16, and the second electrical contact 76 includes a connector 118 configured to electrically couple the second electrical contact 76 to other components of the electrical system 16.

Figure 7:
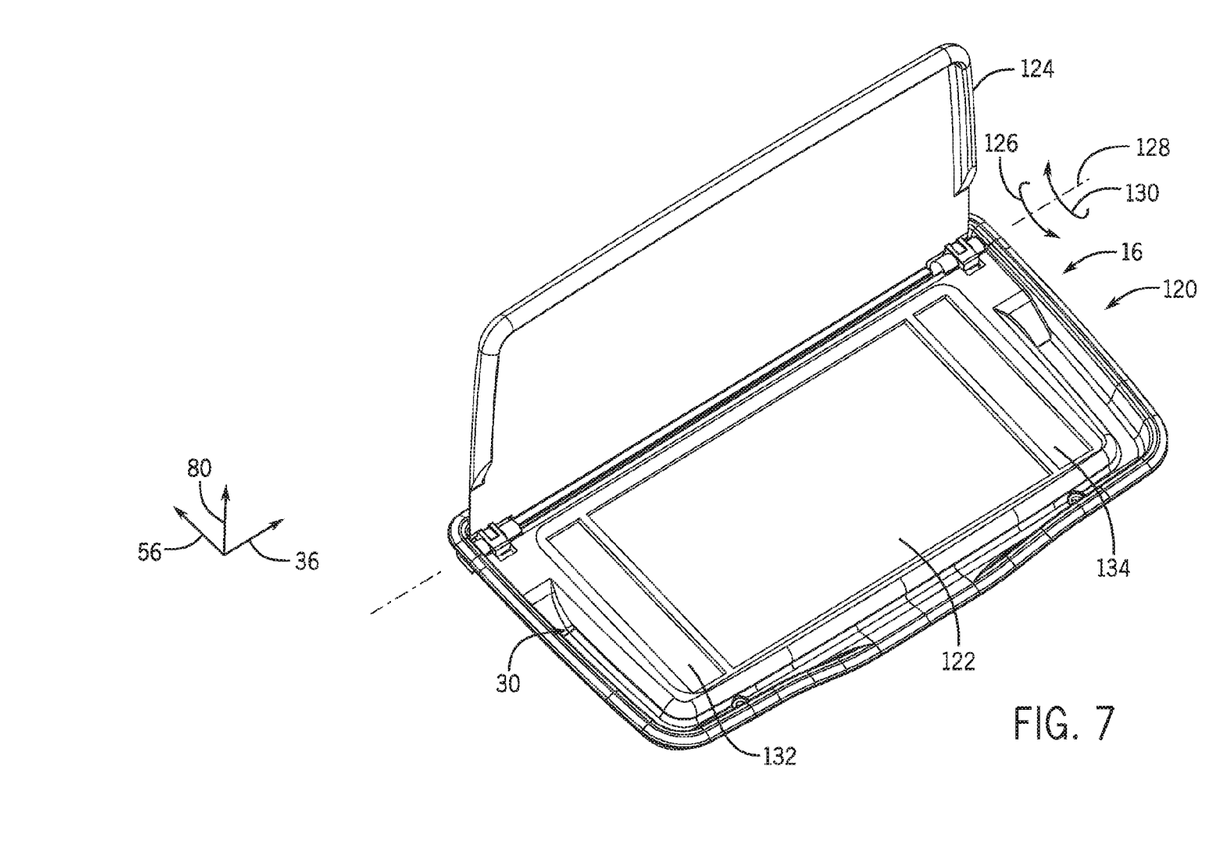
FIG. 7 is a perspective view of an embodiment of a vanity mirror assembly that may be employed within the sun visor assembly of FIG. 3, in which the sun visor assembly includes an electrical system.

FIG. 7 is a perspective view of an embodiment of a vanity mirror assembly 120 that may be employed within the sun visor assembly of FIG. 3, in which the sun visor assembly 120 includes an electrical system 16. In the illustrated embodiment, the vanity mirror assembly 120 includes a vanity mirror 122 configured to enable a vehicle occupant to view a reflection in the vanity mirror 122. The vanity mirror assembly 120 also includes a vanity mirror cover 124 configured to selectively cover the vanity mirror 120. For example, the vehicle occupant may rotate the vanity mirror cover 124 in a direction 126 about a rotational axis 128 from the illustrated open position (e.g., a position that exposes the vanity mirror 122) to a closed position (e.g., a position that conceals the vanity mirror 122), and the vehicle occupant may rotate the vanity mirror cover 124 in a direction 130 about the rotational axis 128 from the closed position to the illustrated open position. In certain embodiments, rotating the vanity mirror cover 124 to the open position engages the lighting system 30, thereby enabling the vehicle occupant to view the reflection during low light conditions.

In the illustrated embodiment, the lighting system 30 includes a first light guide 132 positioned on a first side of the vanity mirror 122 along the lateral axis 36, and the lighting system 30 includes a second light guide 134 positioned on a second side of the vanity mirror 122, opposite the first side, along the lateral axis 36. As discussed in detail below, a circuit board is positioned above the light guides 132 and 134 along the vertical axis 56. The circuit board includes light sources mounted to the circuit board and directed toward respective light receiving surfaces of the light guides. The light guides are configured to receive the light from the light sources and to direct the light toward the vehicle interior (e.g., along the longitudinal axis 80), thereby illuminating the vehicle occupant.

Figure 8:
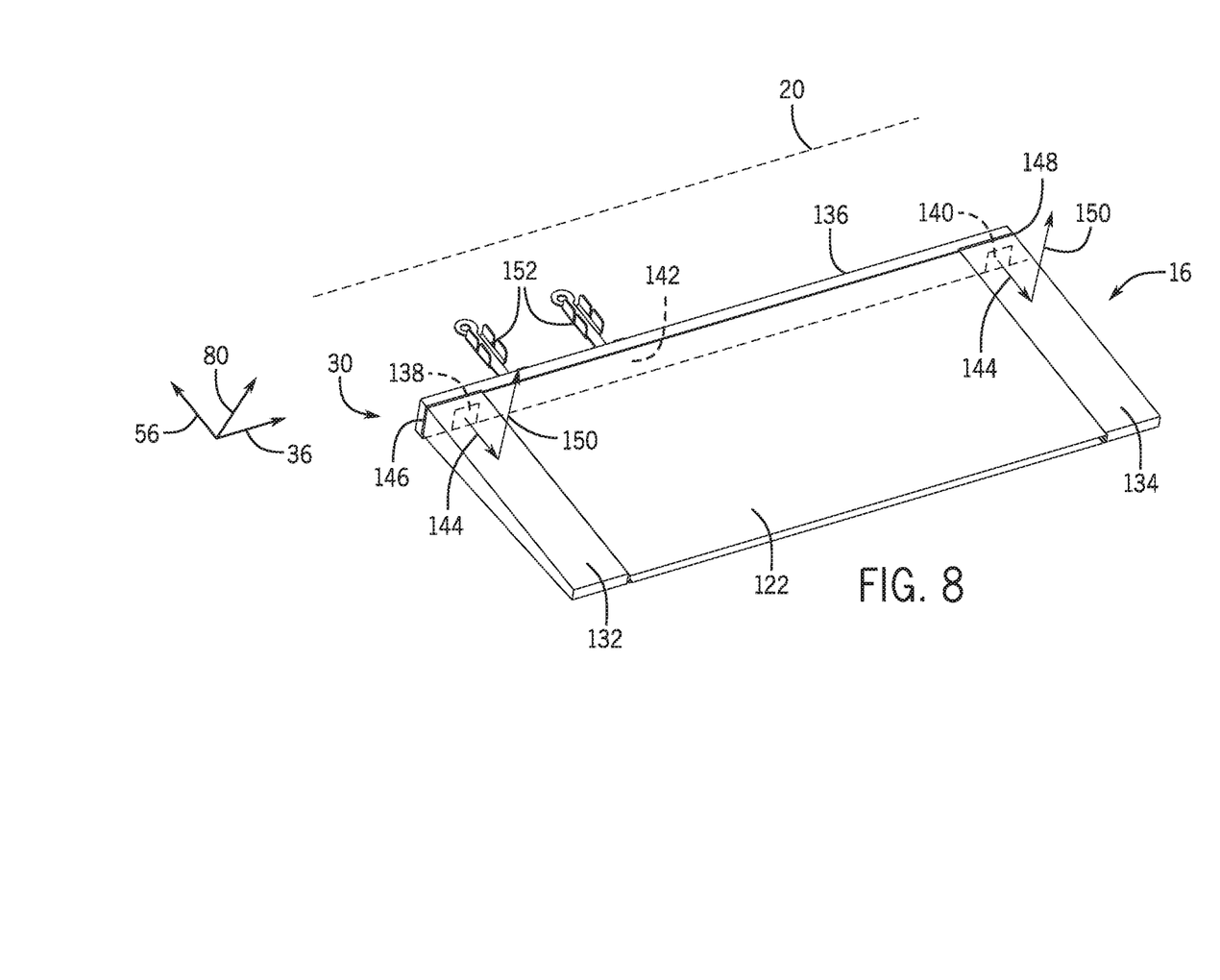
FIG. 8 is a perspective view of the electrical system of FIG. 7.

FIG. 8 is a perspective view of the electrical system 16 of FIG. 7. In the illustrated embodiment, the lighting system 30 of the electrical system 16 includes a circuit board 136 extending along the longitudinal axis 36. The lighting system 30 also includes a first light source 138 (e.g., LED, organic light emitting diode (OLED), etc.) and a second light source 140 (e.g., LED, OLED, etc.). Each light source 138 and 140 is mounted to a mounting surface 142 of the circuit board 136 that extends substantially perpendicularly to the vertical axis 56. As used herein, substantially perpendicularly refers to an angle between the vertical axis 56 and the mounting surface 142 of the circuit board 136 of about 45 degrees to about 135 degrees, about 60 degrees to about 120 degrees, about 75 degrees to about 105 degrees, 85 degrees to about 95 degrees, or about 90 degrees. Each light source 138 and 140 is configured to emit light in a direction 144 substantially perpendicular to the mounting surface 142 of the circuit board 136. In addition, the first light guide 132 is configured to receive the light from the first light source 138 through a light receiving surface 146 of the first light guide 132, and the second light guide 134 is configured to receive the light from the second light source 140 through a light receiving surface 148 of the second light guide 134. In the illustrated embodiment, the mounting surface 142 of the circuit board 136 faces toward the light receiving surface of each light guide such that the light from each light source is directed toward the light receiving surface of a respective light guide. Each light guide is configured to emit the light from the respective light source toward the vehicle interior (e.g., along the longitudinal axis 80) in a direction 150 (e.g., by reflecting the light from the direction 144 to the direction 150 via one or more reflective and/or refractive surfaces), thereby illuminating a vehicle occupant.

Because the mounting surface 142 of the circuit board 136 faces the light receiving surface 146 of the first light guide 132 and the light receiving surface 148 of the second light guide 134, the first light source 138 and the second light source 140 may each include a top-emitting LED. As a result, the efficiency of the visor electrical system 16 may be enhanced, as compared to an electrical system that employs side-emitting LED(s). While each light source 138 and 140 in the illustrated embodiment includes a single light emitting element (e.g., LED, OLED, etc.), it should be appreciated that in alternative embodiments, at least one light source may include more light emitting elements (e.g., 1, 2, 3, 4, or more). Furthermore, while the illustrated embodiment includes two light guides (i.e., one light guide on each lateral side of the vanity mirror), it should be appreciated that in alternative embodiments, the lighting system 30 may include more or fewer light guides (e.g., 1, 2, 3, 4, or more). The light guide(s) may also be arranged in any suitable location relative to the vanity mirror. In addition, while the circuit board 136 is positioned above the light guides 132 and 134 (e.g., closer to the rotational axis 20 than the light guides) in the illustrated embodiment, it should be appreciated that in alternative embodiments, the circuit board may be positioned below the light guides (e.g., farther from the rotational axis than the light guides).

In the illustrated embodiment, electrical power is provided to the circuit board 136 by two metal stampings 152 (e.g., clamped to the circuit board). However, it should be appreciated that in alternative embodiments, electrical power may be provided to the circuit board by wires or any other suitable electrical conductors. In certain embodiments, a controller, such as the controller described above with reference to FIG. 3, is mounted to the mounting surface of the circuit board, thereby facilitating control of the light sources. In addition, it should be appreciated that other electrical components may be mounted to the mounting surface of the circuit board, or any other suitable surface of the circuit board, in certain embodiments.

In certain embodiments, an electrical conductor (e.g., metal stamping) may be positioned to selectively contact electrical contacts on the circuit board 136 to complete a circuit that activates the light sources 138 and 140. For example, the electrical conductor may be coupled to the vanity cover and positioned such that the electrical conductor contacts the electrical contacts while the vanity cover is in the open position. In further embodiments, the vanity cover may be configured to drive an electrical conductor (e.g., coupled to the vanity mirror assembly, the sun visor body, etc.) into contact with the electrical contacts of the circuit board while the vanity cover is in the open position. Accordingly, the light sources 138 and 140 may be activated while the vanity cover is in the open position and deactivated while the vanity cover is in the closed position.

While only certain features and embodiments have been illustrated and described, many modifications and changes may occur to those skilled in the art (e.g., variations in sizes, dimensions, structures, shapes and proportions of the various elements, values of parameters (e.g., temperatures, pressures, etc.), mounting arrangements, use of materials, colors, orientations, etc.) without materially departing from the novel teachings and advantages of the subject matter recited in the claims. The order or sequence of any process or method steps may be varied or re-sequenced according to alternative embodiments. It is, therefore, to be understood that the appended claims are intended to cover all such modifications and changes as fall within the true spirit of the disclosure. Furthermore, in an effort to provide a concise description of the exemplary embodiments, all features of an actual implementation may not have been described (i.e., those unrelated to the presently contemplated best mode, or those unrelated to enablement). It should be appreciated that in the development of any such actual implementation, as in any engineering or design project, numerous implementation specific decisions may be made. Such a development effort might be complex and time consuming, but would nevertheless be a routine undertaking of design, fabrication, and manufacture for those of ordinary skill having the benefit of this disclosure, without undue experimentation.

The invention claimed is:

1. A vehicle sun visor assembly, comprising:
a sun visor body; and
an electrical system, comprising:
an electrical device coupled to the sun visor body;
a power source tray configured to receive a power source, wherein the sun visor body comprises a mounting feature configured to couple the power source tray to the sun visor body and to facilitate removal of the power source tray from the sun visor body; and
at least one electrical contact coupled to the sun visor body and configured to establish an electrical connection between the power source and the electrical device while the power source tray is engaged with the mounting feature.

2. The vehicle sun visor assembly of claim 1, wherein the sun visor body is configured to rotate about a rotational axis between a deployed position and a storage position, and a lateral centerline of the power source tray is positioned closer to the rotational axis than to a lateral centerline of the sun visor body while the power source tray is engaged with the mounting feature.

3. The vehicle sun visor assembly of claim 1, wherein the mounting feature comprises an opening in the sun visor body, the power source tray comprises a first guide feature, the sun visor body comprises a second guide feature, and the first guide feature is configured to engage the second guide feature to guide the power source tray through the opening.

4. The vehicle sun visor assembly of claim 1, wherein the power source tray comprises at least one slot, the power source comprises at least one coin cell battery, and the at least one slot is configured to receive the at least one coin cell battery.

5. The vehicle sun visor assembly of claim 4, wherein the at least one coin cell battery comprises a plurality of coin cell batteries, and the at least one slot is configured to receive the plurality of coin cell batteries stacked on top of one another.

6. The vehicle sun visor assembly of claim 4, wherein the at least one slot comprises a plurality of slots, the at least one coin cell battery comprises a plurality of coin cell batteries, and each slot is configured to receive at least one of the plurality of coin cell batteries.

7. The vehicle sun visor assembly of claim 1, wherein the at least one electrical contact is formed from a metal stamping.

8. The vehicle sun visor assembly of claim 1, wherein the mounting feature comprises an opening in the sun visor body, and the opening is configured to facilitate removal of the power source tray via translation of the power source tray along a lateral axis.

9. A vehicle sun visor assembly, comprising:
a sun visor body; and
an electrical system comprising a power source mounting assembly configured to receive a power source;
wherein the sun visor body is configured to rotate about a rotational axis between a deployed position and a storage position, and a lateral centerline of the power source mounting assembly is positioned closer to the rotational axis than to a lateral centerline of the sun visor body.

10. The vehicle sun visor assembly of claim 9, wherein the power source mounting assembly comprises a power source tray, and the power source tray is selectively removable from the sun visor body.

11. The vehicle sun visor assembly of claim 9, wherein the electrical system comprises at least one electrical contact coupled to the sun visor body and configured to establish an electrical connection with the power source.

12. The vehicle sun visor assembly of claim 11, wherein the at least one electrical contact is formed from a metal stamping.

13. The vehicle sun visor assembly of claim 9, wherein the electrical system comprises an electrical port configured to receive electrical power, and the electrical port is configured to be electrically coupled to the power source.

14. The vehicle sun visor assembly of claim 9, wherein the electrical system comprises an energy harvester configured to be electrically coupled to the power source.

15. A vehicle sun visor assembly, comprising:
a sun visor body; and
an electrical system, comprising:
an electrical device coupled to the sun visor body;
a power source tray configured to receive a power source, wherein the sun visor body has an opening configured to enable the power source tray to be at least partially disposed within the sun visor body; and
at least one electrical contact coupled to the sun visor body and configured to establish an electrical connection between the power source and the electrical device while the power source tray is at least partially disposed within the sun visor body.

16. The vehicle sun visor assembly of claim 15, wherein the opening is positioned on a lateral side of the sun visor body.

17. The vehicle sun visor assembly of claim 15, wherein the power source tray comprises a slot configured to receive the power source.

18. The vehicle sun visor assembly of claim 15, wherein the at least one electrical contact is formed from a metal stamping.

19. The vehicle sun visor assembly of claim 15, wherein the sun visor body is configured to rotate about a rotational axis between a deployed position and a storage position, and a lateral centerline of the power source tray is positioned closer to the rotational axis than to a lateral centerline of the sun visor body while the power source tray is at least partially disposed within the sun visor body.

20. The vehicle sun visor assembly of claim 15, wherein the power source tray comprises a first guide feature, the sun visor body comprises a second guide feature, the opening is configured to facilitate insertion and removal of the power source tray via translation of the power source tray along a lateral axis, and the first guide feature is configured to engage the second guide feature to guide the power source tray through the opening along the lateral axis.

* * * * *